(12) United States Patent
Hu et al.

(10) Patent No.: US 10,875,623 B2
(45) Date of Patent: Dec. 29, 2020

(54) HIGH TEMPERATURE THERMOPLASTIC PRE-IMPREGNATED STRUCTURE FOR AIRCRAFT HEATED FLOOR PANEL

(71) Applicant: Goodrich Corporation, Charlotte, NC (US)

(72) Inventors: Jin Hu, Hudson, OH (US); Nathaniel Ching, Hartville, OH (US); Wenping Zhao, Glastonbury, CT (US); Casey Slane, Tallmadge, OH (US); Galdemir Cezar Botura, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 230 days.

(21) Appl. No.: 16/026,855

(22) Filed: Jul. 3, 2018

(65) Prior Publication Data
US 2020/0010168 A1    Jan. 9, 2020

(51) Int. Cl.
*H05B 3/20* (2006.01)
*H05B 3/28* (2006.01)
(Continued)

(52) U.S. Cl.
CPC ............... *B64C 1/18* (2013.01); *B32B 3/12* (2013.01); *B32B 5/02* (2013.01); *B32B 5/18* (2013.01); *B32B 5/245* (2013.01); *B32B 5/26* (2013.01); *B32B 15/14* (2013.01); *B32B 27/12* (2013.01); *B32B 37/06* (2013.01); *B32B 37/146* (2013.01); *B32B 37/185* (2013.01); *B64C 1/00* (2013.01); *B32B 2260/023* (2013.01); *B32B 2260/046* (2013.01); *B32B 2262/101* (2013.01); *B32B 2262/106* (2013.01); *B32B 2266/02* (2013.01); *B32B 2266/06* (2013.01);
(Continued)

(58) Field of Classification Search
CPC ............ H05B 2203/026; H05B 1/0236; H05B 3/20–267; H05B 3/28–30
See application file for complete search history.

(56) References Cited

U.S. PATENT DOCUMENTS

| | | | |
|---|---|---|---|
| 949,389 A | | 2/1910 | Almgren |
| 4,990,755 A | * | 2/1991 | Nishimura ............. H05B 3/146 219/549 |

(Continued)

FOREIGN PATENT DOCUMENTS

| | | |
|---|---|---|
| EP | 1638371 A1 | 3/2006 |
| EP | 2113456 A2 | 11/2009 |

(Continued)

OTHER PUBLICATIONS

Extended European Search Report for EP Application No. 19183864.8, dated Oct. 31, 2019, pp. 8.

(Continued)

*Primary Examiner* — Michael A Laflame, Jr.
(74) *Attorney, Agent, or Firm* — Kinney & Lange, P.A.

(57) ABSTRACT

A heated floor panel assembly for aircraft includes structural layers made of a fiber matrix and a high temperature thermoplastic resin. The structural layers are within the heated floor panel assembly to protect the other assembly components from damage and absorb stress. The heated floor panel assembly further includes a heating layer with a heating element, an impact layer, and a core layer to take shear stress exerted on the assembly.

18 Claims, 2 Drawing Sheets

(51) Int. Cl.
*B64C 1/18* (2006.01)
*B32B 3/12* (2006.01)
*B32B 5/02* (2006.01)
*B32B 5/18* (2006.01)
*B32B 5/24* (2006.01)
*B32B 5/26* (2006.01)
*B32B 15/14* (2006.01)
*B32B 27/12* (2006.01)
*B32B 37/06* (2006.01)
*B32B 37/14* (2006.01)
*B32B 37/18* (2006.01)
*B64C 1/00* (2006.01)

(52) U.S. Cl.
CPC ..... *B32B 2266/08* (2013.01); *B32B 2305/076* (2013.01); *B32B 2305/345* (2013.01); *B32B 2307/542* (2013.01); *B32B 2307/558* (2013.01); *B32B 2313/04* (2013.01); *B32B 2315/085* (2013.01); *B32B 2371/00* (2013.01); *B32B 2379/08* (2013.01); *B32B 2605/18* (2013.01); *B64C 2001/0072* (2013.01)

(56) References Cited

U.S. PATENT DOCUMENTS

| | | |
|---|---|---|
| 5,175,198 A | 12/1992 | Minnick et al. |
| 5,451,747 A | 9/1995 | Sullivan et al. |
| 5,547,735 A | 8/1996 | Roebroeks et al. |
| 5,806,796 A | 9/1998 | Healey |
| 6,429,157 B1 | 8/2002 | Kishi et al. |
| 6,519,835 B1 | 2/2003 | Von Arx et al. |
| 6,611,659 B2 | 8/2003 | Meisiek |
| 6,825,137 B2 | 11/2004 | Fu et al. |
| 6,834,159 B1 | 12/2004 | Schramm |
| 7,087,296 B2 | 8/2006 | Porter |
| 7,247,822 B2 | 7/2007 | Johnston |
| 7,800,028 B2 | 9/2010 | Wang |
| 8,070,994 B2 | 12/2011 | Carlson et al. |
| 8,158,245 B2 | 4/2012 | Pratte et al. |
| 8,286,919 B2 | 10/2012 | Gerken et al. |
| 8,523,113 B2 | 9/2013 | Atkinson |
| 8,752,279 B2 | 6/2014 | Brittingham et al. |
| 8,772,676 B2 | 7/2014 | Augustine et al. |
| 9,161,393 B2 | 10/2015 | Kaiserman et al. |
| 9,253,823 B2 | 2/2016 | Nordman et al. |
| 9,427,940 B2 | 8/2016 | Bremmer et al. |
| 9,493,894 B2 | 11/2016 | Butler et al. |
| 9,550,330 B2 | 1/2017 | Pratte et al. |
| 9,593,917 B2 | 3/2017 | Pilpel |
| 9,630,701 B2 | 4/2017 | Hu |
| 9,736,888 B2 | 8/2017 | Duce et al. |
| 9,782,944 B2 | 10/2017 | Martin et al. |
| 9,855,721 B2 | 1/2018 | Drexler et al. |
| 9,914,522 B2 | 3/2018 | Nehring |
| 9,939,087 B2 | 4/2018 | Kolarski et al. |
| 2004/0078976 A1 | 4/2004 | Ahn et al. |
| 2005/0042416 A1 | 2/2005 | Blackmon et al. |
| 2006/0138279 A1 | 6/2006 | Pisarski |
| 2008/0210820 A1 | 9/2008 | Kismarton et al. |
| 2009/0011210 A1 | 1/2009 | Gao et al. |
| 2009/0236327 A1 | 9/2009 | Everly et al. |
| 2009/0321414 A1* | 12/2009 | Dohring ............... H05B 3/28 219/522 |
| 2011/0108545 A1 | 5/2011 | Wang et al. |
| 2012/0234819 A1 | 9/2012 | Berger |
| 2014/0044914 A1 | 2/2014 | Kurtz et al. |
| 2014/0071216 A1 | 3/2014 | Hu et al. |
| 2015/0053663 A1* | 2/2015 | Sakota ............... H05B 3/267 219/202 |
| 2015/0076137 A1 | 3/2015 | Kim |
| 2015/0373782 A1 | 12/2015 | Kang et al. |
| 2016/0007474 A1 | 1/2016 | Dardona et al. |
| 2016/0121933 A1 | 5/2016 | Ohmura |
| 2016/0121993 A1* | 5/2016 | Nehring ............... B64C 1/40 244/118.5 |
| 2016/0297509 A1 | 10/2016 | Estadieu et al. |
| 2016/0340020 A1 | 11/2016 | Owens et al. |
| 2016/0361889 A1 | 12/2016 | Bartolome |
| 2017/0050395 A1 | 2/2017 | Vos et al. |
| 2017/0158898 A1 | 6/2017 | Xiao et al. |
| 2017/0238369 A1 | 8/2017 | Owens et al. |
| 2017/0245326 A1* | 8/2017 | Rivat ............... D06N 3/042 |
| 2017/0254065 A1 | 9/2017 | Hegenbart et al. |
| 2018/0050523 A1 | 2/2018 | Pilpel et al. |
| 2018/0057748 A1 | 3/2018 | Hochstetter et al. |
| 2018/0124874 A1 | 5/2018 | Dardona et al. |
| 2018/0127081 A1 | 5/2018 | Toral Vazquez et al. |
| 2018/0176989 A1 | 6/2018 | Hu et al. |
| 2020/0010169 A1 | 1/2020 | Slane et al. |

FOREIGN PATENT DOCUMENTS

| | | |
|---|---|---|
| EP | 3015360 A1 | 5/2016 |
| EP | 3095690 A2 | 11/2016 |
| EP | 3339013 A1 | 6/2018 |
| GB | 1444718 A | 8/1976 |
| JP | H0732518 A | 2/1995 |
| JP | 4862913 B2 | 1/2012 |
| WO | WO2012087294 A1 | 6/2012 |
| WO | WO2017186895 A1 | 11/2017 |

OTHER PUBLICATIONS

Extended European Search Report for EP Application No. 19183891.1, dated Nov. 4, 2019, pp. 7.
Extended European Search Report for EP Application No. 19182513.2, dated Nov. 28, 2019, pp. 6.
Extended European Search Report for EP Application No. 19184091.7, dated Nov. 28, 2019, pp. 6.
Extended European Search Report for EP Application No. 19183571.9, dated Nov. 29, 2019, pp. 7.
Extended European Search Report for EP Application No. 19183876.2, dated Oct. 25, 2019, pp. 5.

* cited by examiner

HIGH TEMPERATURE THERMOPLASTIC PRE-IMPREGNATED STRUCTURE FOR AIRCRAFT HEATED FLOOR PANEL

BACKGROUND

This application relates generally to heated floor panel assemblies for aircraft, and specifically to structural layers for heated floor panel assemblies.

Heated floor panels are often used in aircraft to mitigate the effects of cold underfloor temperatures and to help maintain a comfortable cabin temperature. The floor panels are typically supported by an aircraft structure arranged, for example, in a grid-like pattern. The floor panels have structural integrity sufficient to support the weight of people and objects resting on the panels. Structural layers typically forms the middle of the panel to protect and cushion the surrounding layers (e.g. weight supporting layers and/or a heating layer) from stresses due to punctures from high heels, chips from dropped objects, scratches from dragged luggage, and/or other floor-traffic related hazards.

Structural layers can be made with pre-impregnated fabrics where a fiber matrix is impregnated with a resin. Typically, the resin used is an epoxy or phenolic resin. But structural layers built with these types of materials do not meet flame, smoke, and toxicity requirements, thus, epoxy or phenolic resin based pre-impregnated fabrics are generally modified for use as impact layers in heated floor panels. Modified epoxy or phenolic resin based pre-impregnated fabrics typically have lower mechanical strength overall. Thus, an alternative type of structural layers that both meets flame, smoke, and toxicity requirements, and has sufficient mechanical strength, is needed.

SUMMARY

In one embodiment, a floor panel assembly has a bottom surface and a top surface. The floor panel assembly includes a first stack of structural layers adjacent the bottom surface, a core layer, adjacent the first stack of structural layers, a second stack of structural layers between the core layer and the top surface, a heating layer between the core layer and the top surface, and an impact layer between the heating layer and the top surface. The first stack of structural layers includes a first fiber matrix and a first high temperature thermoplastic resin infiltrating the first fiber matrix. The core layer absorbs shear stress. The second stack of structural layers includes a second fiber matrix and a second high temperature thermoplastic resin infiltrating the second fiber matrix. The first stack of structural layers, the core layer, the second stack of structural layers, the heating layer, and the impact layer are bonded together.

In a different embodiment, a method of making a floor panel assembly includes aligning an impact layer, a heater, a core layer, and one or more structural layers each comprising a high temperature thermoplastic pre-impregnated fabric and bonding the impact layer, the heater, the core layer, and the one or more structural layers together.

DETAILED DESCRIPTION

The present invention is directed to a composite panel, and more specifically, to a heated floor panel with a high temperature thermoplastic resin impregnated structural layer. The structural layer includes a fiber network impregnated with a high temperature thermoplastic in lieu of traditional adhesive. The panel further includes an impact layer and a core layer supporting the assembly, and a heating layer containing a heating element. The high temperature thermoplastic resin impregnated structural layer meets flame, smoke, and toxicity requirements (FST) and also maintains a high mechanical strength.

Figure 1:
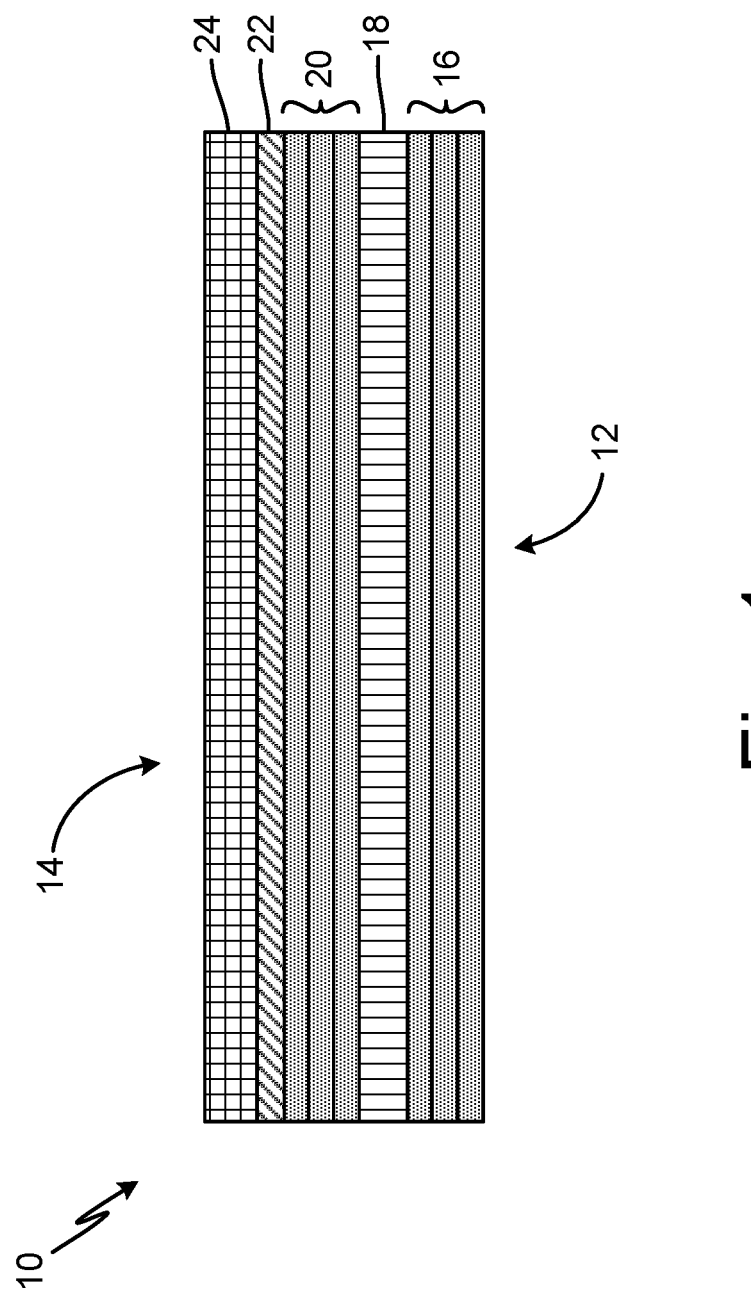
FIG. 1 is a schematic diagram of a heated floor panel assembly.

FIG. 1 is a schematic diagram of heated floor panel assembly 10 having bottom surface 12 and top surface 14. Assembly 10 contains first stack of structural layer 16, core layer 18, second stack of structural layers 20, heating layer 22, and impact layer 24.

Bottom surface 12 of assembly 10 is attached to an aircraft, while top surface 14 faces the inside of an aircraft cabin or other floor area needing to be heated. Components 16, 18, 20, 22, and 24 are arranged between bottom surface 12 and top surface 14. First stack of structural layers 16 is attached to bottom surface 12. Core layer 18 is attached to first stack of structural layers 16 opposite bottom surface 12. Second stack of structural layers 20 is attached to core layer 18 opposite first stack of structural layers 16. Heating layer 22 is attached to second stack of structural layers 20 opposite core layer 18. Impact layer 24 is attached to heating layer 22 opposite second stack of structural layers 20. Impact layer 24 faces top surface 14.

Stacks of structural layers 16 and 20 provide reinforcement to assembly 10. Stacks of structural layers 16 and 20 can be a reinforced polymer, such as a carbon fiber or fiberglass impregnated with a high temperature thermoplastic. Each of stacks of structural layers 16 and 20 can include a single ply, or a stack of plies, depending on, for example, the material chosen to form the structural layers, or the particular need for reinforcement. Additional and/or alternative structural layers can also be added in other embodiments.

The resin of structural layers 16 and 20 is a high temperature thermoplastic, such as polyetherimide (PEI) or polyether ketone (PEEK), as opposed to a traditional epoxy or phenolic resin. High temperature thermoplastics (also known as high-performance thermoplastics) have working temperatures up to 150 to 400 degrees Celsius and have significant retention of physical properties, dimensional stability, and electrical characteristics at increased high temperatures. Thus, high temperature thermoplastics have higher heat deflection temperatures, glass transition temperatures, and continuous use temperature. Additionally, high temperature thermoplastics also offer better chemical resistance than most other polymers. High temperature thermoplastics are known to have enhanced mechanical properties, resistance to damages, and be recyclable.

As an example, PEEK contains excellent mechanical and chemical resistance during high temperature applications. PEEK has tensile modulus strength of 90-200 MPa, a melting temperature of 343 degrees Celsius, and a density of 1.32 g/cm$^3$. Similarly, PEI offers outstanding elevated thermal resistance, high strength, stiffness and chemical resistance. PEI has a tensile modulus strength between 96-190 MPa, a melting temperature above 217 degrees Celsius, and an amorphous density of 1.27 g/cm$^3$.

The resin in structural layers 16 and 20 can be a polyether ether ketone (PEEK), polyaryletherketones (PAEK), polycarbonate (PC), polyphenylene sulfide (PPS), polyetherimide (PEI), polyimide, poly(methyl methacrylate) (PMMA), polyvinyl chloride, polyurethane, or polyamideimide. Structural layers 16 and 20 are pre-impregnated, meaning the fiber matrix of structural layers 16 and 20 is filled with the high temperature thermoplastic resin prior to assembly of floor panel assembly 10. The use of resins with at least 10% elongation for structural layers 16 and 20 means the layer has give and flexibility in geometry and shape of structural layers 16 and 20.

Core layer 18 provides impact resistance to assembly 10, and carries shear loads to stiffen floor panel assembly 10. Core layer 18 can, in an exemplary embodiment, be formed from an expanded honeycomb metallic material, such as aluminum, and can further be arranged in a honeycomb structure. Alternatively, core layer 18 can be formed from an expanded honeycomb polymer, such as aramids (e.g., Kevlar® or Nomex®), as well as an open-cell or closed-cell polymer foam. Generally speaking, a metallic core layer has greater thermal conductivity than a polymer core layer.

Heating layer 22 can include an electrical heating element (not shown) embedded on or in heating layer 22. The heating element can be a resistive heating element formed, for example, from a metallic material, Positive Temperature Control (PTC) ceramic, PTC polymer, or carbon allotrope material such as a carbon nanotube (CNT) heater. The heating element can be arranged as an etched foil, wire, or printed-ink element. Other suitable heating elements are contemplated herein. Heating layer 22 can be used to control the temperature of top surface 14 of assembly 10, which can be installed, for example, in an aircraft cabin or cockpit. In certain embodiments, the heating element can extend across the entire area of heating layer 22. In other embodiments, the heating element can be inset some distance from the edges of heating layer 22 in order to protect the element from fluid spills along or damage at the edges of assembly 10, in which case the heating element is electrically connected to an electrical source via electrodes or wires.

Impact layer 24 contains both a fiber matrix and a resin. The fiber matrix of impact layer 24 can be made of fiberglass or carbon fiber materials. Other suitable high-strength, and low-density materials are contemplated herein. Impact layer 24 is typically infiltrated with a resin, such as a phenolic, epoxy, polyurethane, cyanate ester, or bismaleimide resin. The impact layer may also be impregnated with a thermoplastic resin such as polyether ether ketone (PEEK), polyaryletherketones (PAEK), polycarbonate (PC), polyphenylene sulfide (PPS), polyetherimide (PEI), polyimide, poly (methyl methacrylate) (PMMA), polyvinyl chloride, polyurethane, or polyamideimide. It is sometimes useful for manufacturing purposes to use the same resin in the impact layer as used in the structural layers. Impact layer 24 can be pre-impregnated with the resin prior to assembly of floor panel 10. Impact layer 24, located proximate top surface 12 of floor panel 10 protects the assembly from punctures from high heels, chips from dropped objects, scratches from dragged luggage, and/or other floor-traffic related hazards.

The use of a high temperature thermoplastic resin allows for assembly 10 to meet more stringent flammability, smoke, and toxicity (FST) requirements due to the toughness of the high temperature thermoplastic resin. The U.S. Federal Aviation Administration (FAA) mandates stringent FST characteristics for aircraft cabin components under 14 C.F.R. 25.853. Generally reported as peak heat release (kilowatts per square meter) and total heat release (kilowatts per minute per square meter), the FAA regulatory peak/total requirement number is 65 kW/m$^2$ peak heat release and 65 kW/m$^2$ total heat release. High temperature thermoplastic resins have low smoke release in smoke tests and low flammability, surpassing these requirements.

The use of high temperature thermoplastic resins in structural layers 16 and 20 of assembly 10 has several benefits. High temperature thermoplastics also have high mechanical strength, high level of toughness, strength, stiffness, resistance to fatigue and ductility, sufficiently protecting floor panel assemblies from puncture or damage. Additionally, high temperature thermoplastics show increased resistance to chemicals, solvents, radiation and heat, and do not disintegrate or lose its form upon exposure. The use of high temperature thermoplastic resin allows for easy repair for a broken impact layer; the resin can be used for such repairs.

Figure 2:
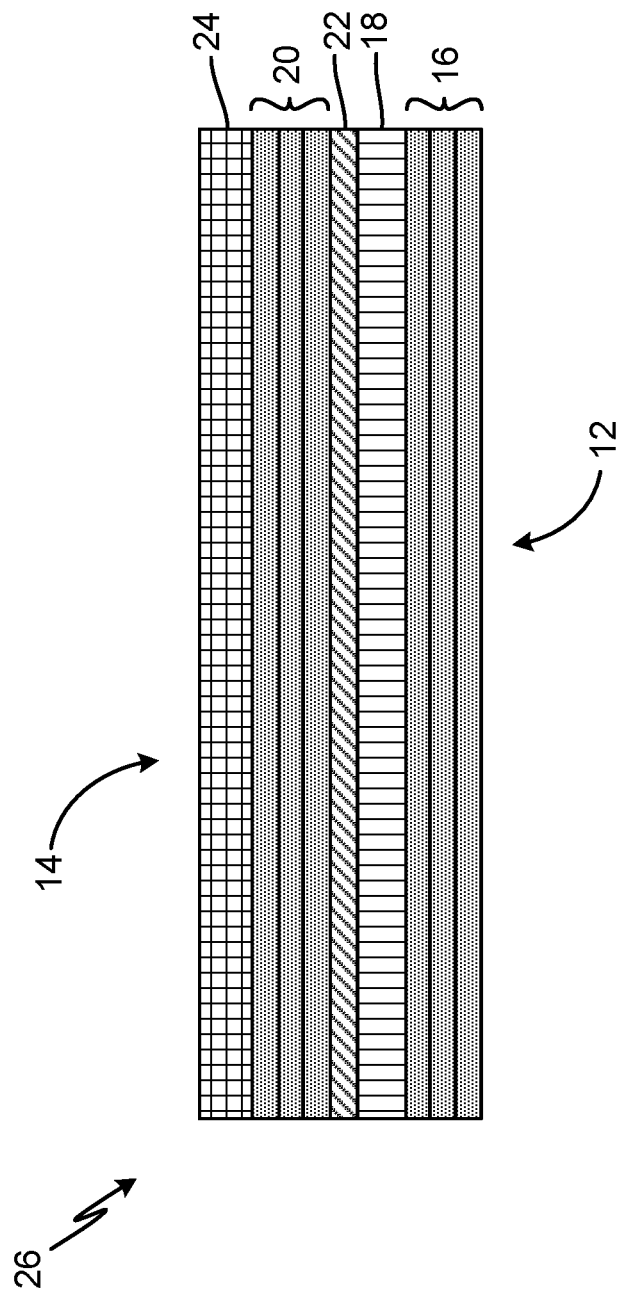
FIG. 2 is a schematic diagram of a heated floor panel assembly in a second embodiment.

FIG. 2 is a schematic diagram of heated floor panel assembly 26. Assembly 26 has many of the same components as assembly 10 in FIG. 1, but arranged in a different configuration.

Here, as in assembly 10, bottom surface 12 of assembly 10 is anchored to an aircraft, and top surface 14 faces the inside of an aircraft cabin or other floor area needing to be heated. Components 16-24 are arranged between bottom surface 12 and top surface 14. First stack of structural layers 16 is attached to bottom surface 12. Core layer 18 is attached to first stack of structural layers 16 opposite bottom surface 12.

However, heating layer 22 is attached to core layer 18 opposite first stack of structural layers 16. Because of this, second stack of structural layers 20 are attached to heating layer 22 opposite core layer 18, and impact layer 24 is attached directly to second stack of structural layers 20. Impact layer 24 faces top surface 14.

The high temperature thermoplastic resin impregnated structural layers meet flame, smoke, and toxicity requirements (FST) and also maintain a high mechanical strength. In particular, high temperature thermoplastic resin based structural layers have low smoke release in smoke tests and low flammability. Thus, these impact layers can replace epoxy or phenolic based structural layers while maintaining high mechanical strength.

Finally, high temperature thermoplastic based structural layers are environmentally friendly. High temperature thermoplastics retain the ability to be remolded several times, and can be recycled or reused while still maintaining dimensional integrity and tensile strength.

Discussion of Possible Embodiments

The following are non-exclusive descriptions of possible embodiments of the present invention.

A floor panel assembly has a bottom surface and a top surface. The floor panel assembly includes a first stack of structural layers adjacent the bottom surface, a core layer, adjacent the first stack of structural layers, a second stack of structural layers between the core layer and the top surface, a heating layer between the core layer and the top surface, and an impact layer between the heating layer and the top surface. The first stack of structural layers includes a first fiber matrix and a first high temperature thermoplastic resin infiltrating the first fiber matrix. The core layer absorbs shear stress. The second stack of structural layers includes a second fiber matrix and a second high temperature thermoplastic resin infiltrating the second fiber matrix. The first stack of structural layers, the core layer, the second stack of structural layers, the heating layer, and the impact layer are bonded together.

The assembly of the preceding paragraph can optionally include, additionally and/or alternatively, any one or more of the following features, configurations and/or additional components:

The first fiber matrix and the second fiber matrix comprise fiber glass or carbon fibers.

The first high temperature thermoplastic resin and second high temperature thermoplastic resin have a working temperature above 200 degrees Celsius.

The first high temperature thermoplastic resin and second high temperature thermoplastic resin have a melting point between 150 and 400 degrees Celsius.

The first high temperature thermoplastic resin and second high temperature thermoplastic resin have a tensile strength between 55 and 110 MPa.

The first high temperature thermoplastic resin and second high temperature thermoplastic resin have a density between 1.0 and 1.5 g/cm$^3$.

The first high temperature thermoplastic resin and second high temperature thermoplastic resin are selected from the group consisting of polyetheretherketone, polyaryletherketones, polycarbonate, polyphenylene sulfide, polyetherimide, polyimide, polymethylmethacrylate (acrylic), polyvinylchloride, polyurethane, and polyamideimide.

The core layer comprises a high density metallic material in a honeycomb structure.

The core layer comprises an expanded honeycomb polymer, an open-cell polymer foam, or closed-cell polymer foam.

The heating layer comprises a metallic material, Positive Temperature Control (PTC) ceramic, PTC polymer, or carbon allotrope material.

The impact layer comprises a reinforced polymer matrix.

The reinforced polymer matrix comprises an impact fiber matrix impregnated with a structural resin.

The impact fiber matrix is a carbon fiber or fiberglass.

The structural resin is epoxy, polyurethane, phenolic, cyanate ester, or bismaleimide.

The heating layer is adjacent the impact layer.

The heating layer is adjacent the core layer.

The first stack of structural layers and the second stack of structural layers have at least 10% elongation.

The first stack of structural layers and the second stack of structural layers have at least 20% elongation.

A method of making a floor panel assembly includes aligning an impact layer, a heater, a core layer, and one or more structural layers each comprising a high temperature thermoplastic pre-impregnated fabric and bonding the impact layer, the heater, the core layer, and the one or more structural layers together.

The method of the preceding paragraph can optionally include, additionally and/or alternatively, any one or more of the following features, configurations and/or additional components:

Bonding the impact layer comprises lamination, heat welding, or laser welding.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A floor panel assembly having a bottom surface and a top surface, the floor panel assembly comprising:
a first stack of structural layers disposed adjacent the bottom surface, wherein the first stack of structural layers includes a first plurality of structural layers bonded together, and wherein each layer of the first plurality of structural layers comprises:
a first fiber matrix; and
a first high temperature thermoplastic resin infiltrating the first fiber matrix;
a core layer, adjacent the first stack of structural layers, that absorbs shear stress;
a heating layer between the core layer and the top surface and adjacent the core layer;
a second stack of structural layers disposed between the heating layer and the top surface and adjacent the heating layer, wherein the second stack of structural layers includes a second plurality of structural layers bonded together, and wherein each layer of the second plurality of structural layers comprises:
a second fiber matrix; and
a second high temperature thermoplastic resin infiltrating the second fiber matrix; and
an impact layer between the heating layer and the top surface and between the second stack of structural layers and the top surface, wherein the first stack of structural layers, the core layer, the heating layer, the second stack of structural layers, and the impact layer are bonded together.

2. The floor panel assembly of claim 1, wherein the first fiber matrix and the second fiber matrix comprise fiber glass or carbon fibers.

3. The floor panel assembly of claim 1, wherein the first high temperature thermoplastic resin and second high temperature thermoplastic resin have a working temperature above 200 degrees Celsius.

4. The floor panel assembly of claim 1, wherein the first high temperature thermoplastic resin and second high temperature thermoplastic resin have a melting point between 150 and 400 degrees Celsius.

5. The floor panel assembly of claim 1, wherein the first high temperature thermoplastic resin and second high temperature thermoplastic resin have a tensile strength between 55 and 110 MPa.

6. The floor panel assembly of claim 1, the first high temperature thermoplastic resin and second high temperature thermoplastic resin have a density between 1.0 and 1.5 g/cm$^3$.

7. The floor panel assembly of claim 1, wherein the first high temperature thermoplastic resin and second high temperature thermoplastic resin are selected from the group consisting of polyetheretherketone, polyaryletherketones, polycarbonate, polyphenylene sulfide, polyetherimide, polyimide, polymethylmethacrylate (acrylic), polyvinylchloride, polyurethane, and polyamideimide.

8. The floor panel assembly of claim 1, wherein the core layer comprises a high density metallic material in a honeycomb structure.

9. The floor panel assembly of claim 1, wherein the core layer comprises an expanded honeycomb polymer, an open-cell polymer foam, or closed-cell polymer foam.

10. The floor panel assembly of claim 1, wherein the heating layer comprises a metallic material, Positive Temperature Control (PTC) ceramic, PTC polymer, or carbon allotrope material.

11. The floor panel assembly of claim 1, wherein the impact layer comprises a reinforced polymer matrix.

12. The floor panel of claim 11, wherein the reinforced polymer matrix comprises an impact fiber matrix impregnated with a structural resin.

13. The floor panel of claim 12, wherein the impact fiber matrix is a carbon fiber or fiberglass.

14. The floor panel of claim 12, wherein the structural resin is epoxy, polyurethane, phenolic, cyanate ester, or bismaleimide.

15. The floor panel assembly of claim 1, wherein the first stack of structural layers and the second stack of structural layers have at least 10% elongation.

16. The floor panel assembly of claim 15, wherein the first stack of structural layers and the second stack of structural layers have at least 20% elongation.

17. A method of making a floor panel assembly having a bottom surface and a top surface and comprising:

aligning a first plurality of structural layers comprising two or more high temperature thermoplastic pre-impregnated fiber matrices adjacent the bottom surface, a core layer adjacent the first plurality of structural layers, a heating layer between the core layer and the top surface and adjacent the core layer, a second plurality of structural layers comprising two or more high temperature thermoplastic pre-impregnated fiber matrices between the heating layer and the top surface, and an impact layer between the heating layer and the top surface and between the second plurality of structural layers and the top surface;

bonding the first plurality of structural layers, core layer, heating layer, second plurality of structural layers, and impact layer together.

18. The method of claim 17, wherein bonding the impact layer comprises lamination, heat welding, or laser welding.

* * * * *